United States Patent
Yoshida et al.

(10) Patent No.: US 8,416,590 B2
(45) Date of Patent: Apr. 9, 2013

(54) POWER SUPPLY DEVICE

(75) Inventors: Michiho Yoshida, Osaka (JP);
Masataka Onishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/128,909

(22) PCT Filed: Oct. 13, 2009

(86) PCT No.: PCT/JP2009/067726
§ 371 (c)(1),
(2), (4) Date: May 12, 2011

(87) PCT Pub. No.: WO2010/064490
PCT Pub. Date: Jun. 10, 2010

(65) Prior Publication Data
US 2011/0228573 A1 Sep. 22, 2011

(30) Foreign Application Priority Data
Dec. 3, 2008 (JP) ................................. 2008-308433

(51) Int. Cl.
*H02M 1/12* (2006.01)
*G05F 1/40* (2006.01)
(52) U.S. Cl. ......................................... 363/45; 323/285
(58) Field of Classification Search .............. 363/44–48; 323/222, 282–287
See application file for complete search history.

(56) References Cited

U.S. PATENT DOCUMENTS

| 6,075,328 A | 6/2000 | Notohara et al. |
| 6,756,771 B1 * | 6/2004 | Ball et al. ..................... 323/222 |
| 6,906,503 B2 * | 6/2005 | Lopez-Santillana et al. .. 323/283 |
| 7,012,413 B1 * | 3/2006 | Ye .................................. 323/284 |
| 7,358,706 B2 * | 4/2008 | Lys ................................ 323/222 |
| 7,456,621 B2 * | 11/2008 | Leung et al. .................. 323/283 |

FOREIGN PATENT DOCUMENTS

| JP | 6-83466 A | 3/1994 |
| JP | 8-33392 A | 2/1996 |
| JP | 8-182329 A | 7/1996 |
| JP | 9-70178 A | 3/1997 |
| JP | 10-127083 A | 5/1998 |
| JP | 2001-95235 A | 4/2001 |
| JP | 2006-20402 A | 1/2006 |
| JP | 2008-109723 A | 5/2008 |

* cited by examiner

*Primary Examiner* — Jessica Han
(74) *Attorney, Agent, or Firm* — Birch, Stewart, Kolasch & Birch, LLP

(57) ABSTRACT

The present power supply device includes a microcomputer that detects a current input to an active filter, a voltage input to the active filter, and a voltage output from the active filter, decreases a target voltage as the input current increases, and controls an IGBT to turn on/off the IGBT to match the input current and the input voltage in phase with each other and also match the output voltage to the target voltage. Thus, as the input current increases, the target voltage is decreased. A power supply terminal can have a voltage with a low noise level.

8 Claims, 6 Drawing Sheets

POWER SUPPLY DEVICE

TECHNICAL FIELD

The present invention relates generally to power supply devices and particularly to power supply devices including an active filter.

BACKGROUND ART

Conventionally, power supply devices for air conditioners, refrigerators and the like receive alternate current (ac) voltage from commercial power supply, rectify the ac voltage by a rectifier circuit such as a diode bridge, smooth the rectified voltage by a smoothing circuit such as a capacitor to generate direct current (dc) voltage, convert the dc voltage by an inverter to ac voltage, and supply the ac voltage to an ac motor.

Such a power supply device's power factor is improved and its power supply harmonic current is reduced, by a method introducing an active filter between a rectifier circuit and a smoothing circuit to match an input current and an input voltage in waveform and phase, as described in Japanese Patent Laying-Open Nos. 8-33392 (Patent Document 1) and 8-182329 (Patent Document 2) for example.

Furthermore, when a power supply device employing an active filter is used, and low ac voltage is received, a large electric power loss is caused. This is resolved by a method allowing the active filter to receive and output voltages, respectively, with a constant difference therebetween, as described in Japanese Patent Laying-Open No. 2006-20402 (Patent Document 3) for example.

Furthermore, a power supply device employing an active filter has a switching element switched at a high frequency, and as the switching element is increased in temperature, it has a high risk of destruction. Accordingly, the switching element's temperature is detected and if it is high a target voltage is reduced, as described in Japanese Patent Laying-Open No. 9-70178 (Patent Document 4) for example.

PRIOR ART DOCUMENTS

Patent Documents

Patent Document 1: Japanese Patent Laying-Open No. 8-33392
Patent Document 2: Japanese Patent Laying-Open No. 8-182329
Patent Document 3: Japanese Patent Laying-Open No. 2006-20402
Patent Document 4: Japanese Patent Laying-Open No. 9-70178

SUMMARY OF THE INVENTION

Problems to be Solved by the Invention

The problems that Patent Documents 1 and 2 have are resolved by Patent Document 3, which, however, also has a switching frequency higher than a power factor improvement circuit (such as a PAM control circuit) other than an active filter, and hence a power supply terminal having a voltage with a high noise level.

Furthermore, Patent Document 4 decreases a target voltage as the switching element's temperature increases. Accordingly, when the switching element has high temperature, the power supply terminal may have a voltage with a reduced noise level. When the switching element has low temperature, however, the power supply terminal has a voltage with a high noise level.

Furthermore, if the techniques disclosed in Patent Documents 1-4 are employed to resolve these problems, an additional hardware configuration will be required and result in the device having an increased size.

Therefore a main object of the present invention is to provide a power supply device allowing a power supply terminal to have a voltage with a low noise level and reduced in size.

Means for Solving the Problems

The present invention provides a power supply device including: a rectifier circuit rectifying a first alternate current voltage; an active filter provided at a stage subsequent to the rectifier circuit; a smoothing circuit smoothing a voltage output from the active filter to generate direct current voltage; and an inverter converting the direct current voltage to a second alternate current voltage. The active filter includes: a reactor having one terminal receiving a voltage output from the rectifier circuit; a diode having an anode connected to the reactor at the other terminal, and a cathode connected to the smoothing circuit; and a switching element connected between the other terminal of the reactor and a line of a reference voltage. The power supply device further includes a microcomputer operative to detect a current input to the active filter, a voltage input to the active filter, and the voltage output from the active filter and generate a target voltage based on the input current, and control the switching element to turn on/off the switching element to match the input current and the input voltage in phase with each other and also match the output voltage to the target voltage.

Preferably, the microcomputer decreases the target voltage as the input current increases.

Still preferably, the power supply device further includes a temperature sensor detecting the temperature of the switching element, and the microcomputer generates the target voltage based on the temperature detected by the temperature sensor and the input current.

Still preferably, the microcomputer decreases the target voltage as the input current increases, and the microcomputer decreases the target voltage as the temperature detected by the temperature sensor increases.

Effects of the Invention

The present power supply device is provided with a microcomputer operative to detect a current input to an active filter, a voltage input to the active filter, and a voltage output from the active filter and generate a target voltage based on the input current, and control a switching element to turn on/off the switching element to match the input current and the input voltage in phase with each other and also match the output voltage to the target voltage. As such, reducing the target voltage for example as the input current increases allows a power supply terminal to have a voltage with a reduced noise level. Furthermore, the active filter is controlled by the microcomputer, and the device can have a reduced dimension.

MODES FOR CARRYING OUT THE INVENTION

First Embodiment

Figure 1:
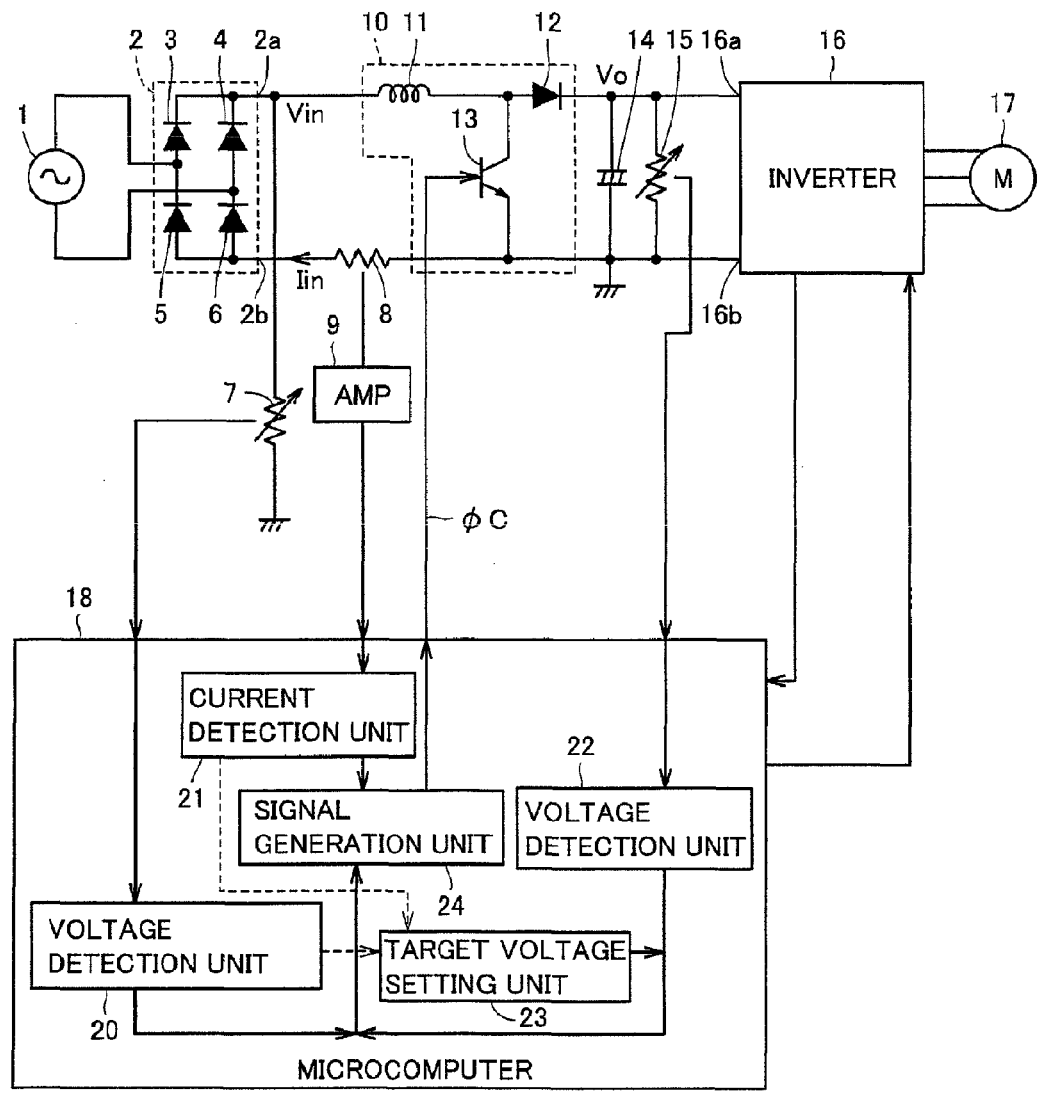
FIG. 1 is a block diagram showing a configuration of a power supply device in a first embodiment of the present invention.

FIG. 1 is a block diagram showing a configuration of a power supply device in a first embodiment of the present invention. In FIG. 1 the power supply device includes a rectifier circuit 2, resistors for voltage division 7 and 15, a resistor for current detection 8, an amplifier 9, an active filter 10, a smoothing capacitor 14, an inverter 16, and a microcomputer 18.

Rectifier circuit 2 includes four diodes 3-6 connected in the form of a bridge. It receives ac voltage from an ac power supply 1 and provides a full-wave rectification thereof. The ac voltage is provided between the anodes of diodes 3 and 4. Diodes 3, 4 have their respective cathodes both connected to a positive voltage output node 2a. Diodes 5, 6 have their respective cathodes connected to diodes 3, 4 at their respective anodes, respectively, and have their respective anodes both connected to a negative voltage output node 2b.

The resistor for voltage division 7 is connected between the rectifier circuit 2 positive voltage output node 2a and a line of a reference voltage. The resistor for voltage division 7 divides a voltage output from rectifier circuit 2, i.e., a voltage Vin input to active filter 10, to generate a signal representing input voltage Vin and provide the signal to microcomputer 18.

The resistor for current detection 8 is connected between the inverter 16 negative voltage input node 16b and the rectifier circuit 2 negative voltage output node 2b, and outputs a signal representing a current Tin input to active filter 10. Amplifier 9 receives the signal output from the resistor for current detection 8, amplifies the received signal and outputs the amplified signal to microcomputer 18. Inverter 16 has negative voltage input node 16b connected to a line of the reference voltage.

Active filter 10 includes a reactor 11, a diode 12, and an insulated gate bipolar transistor (IGBT) 13. Reactor 11 has one terminal connected to rectifier circuit 2 at positive voltage output node 2a. Diode 12 has an anode connected to reactor 11 at the other terminal, and a cathode connected to inverter 16 at a positive voltage input node 16a. IGBT 13 has a collector connected to reactor 11 at the other terminal, an emitter connected to a line of the reference voltage, and a gate receiving a control signal φC from microcomputer 18.

Smoothing capacitor 14 has a positive electrode connected to diode 12 at the cathode, and a negative electrode connected to a line of the reference voltage. Smoothing capacitor 14 receives a voltage Vo output from active filter 10 to smooth voltage Vo to generate dc voltage. The resistor for voltage division 15 is connected to smoothing capacitor 14 in parallel. It receives voltage Vo output from active filter 10, divides voltage Vo to generate a signal representing output voltage Vo, and provides the signal to microcomputer 18. Inverter 16 receives voltage Vo output from active filter 10 to convert the voltage to 3-phase ac voltage and provides the 3-phase ac voltage to an ac motor 17.

Microcomputer 18 is operative in response to a dc current signal received from inverter 16, a signal received from motor 17 indicating a position of a rotor of the motor relative to a stator of the motor, and the like to control inverter 16. Furthermore, microcomputer 18 is operative in accordance with input voltage Vin, input current Iin, and output voltage Vo to control IGBT 13 to turn it on/off to match input voltage Vin and input current Iin in waveform and phase to bring a power factor close to one and also match output voltage Vo to a target voltage Vt. Furthermore, microcomputer 18 decreases target voltage Vt as input current Iin increases.

More specifically, microcomputer 18 includes voltage detection units 20 and 22, a current detection unit 21, a target voltage setting unit 23, and a signal generation unit 24. Voltage detection unit 20 is operative in response to a signal received from the resistor for voltage division 7 to generate a digital signal representing voltage Vin input to active filter 10 in waveform, phase, amplitude and the like. Current detection unit 21 is operative in response to a signal received from amplifier 9 to generate a digital signal representing current Iin input to active filter 10 in waveform, phase, amplitude and the like. Voltage detection unit 22 is operative in response to a signal received from the resistor for voltage division 15 to generate a digital signal representing voltage Vo output from active filter 10 in level.

Target voltage setting unit 23 is operative in response to signals received from voltage detection unit 20 and current detection unit 21 to generate target voltage Vt. Target voltage Vt decreases as current Iin input to active filter 10 increases. Signal generation unit 24 is operative in accordance with input voltage Vin, input current Iin, and output voltage Vo to generate control signal φC to control IGBT 13 to turn it on/off to match input voltage Vin and input current Iin in waveform and phase to bring a power factor close to one, and also to match output voltage Vo to target voltage Vt.

More specifically, control signal φC is a function of input voltage Vin, input current Iin and output voltage Vo, and φC=x(Vin, Iin, Vo). Furthermore, output voltage Vo is a function of target voltage Vt, output voltage Vo and input voltage Vin, and Vo=y(Vt, Vo, Vin). Input voltage Vin and output voltage Vo are controlled to have a fixed relationship. Furthermore, as input current Iin increases, target voltage Vt decreases, so that if input voltage Vin decreases, electric power loss does not vary.

Control signal φC turns on/off IGBT 13 periodically as determined by any set value stored in microcomputer 18. For example, a data-rewritable flash memory can be used to store any set value to allow the value to be modified. Considering noise and the power supply terminal having a voltage with a noise level, active filter 10 is switched at a frequency set at 15 kHz to 20 kHz in general.

Figure 2:
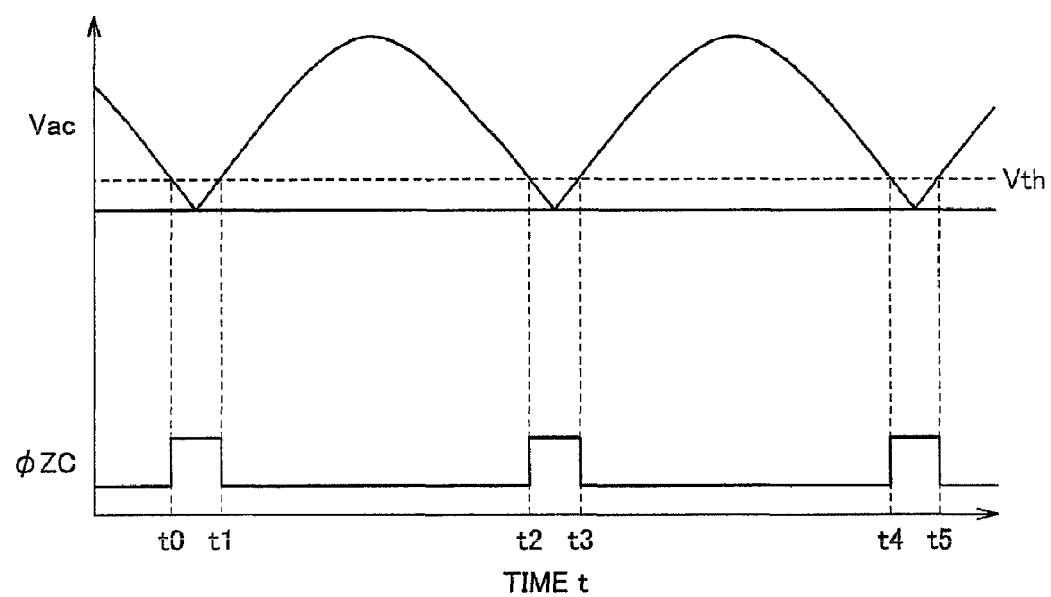
FIG. 2 represents a method of generating a zero cross detection signal in a microcomputer shown in FIG. 1.

Furthermore, control signal φC is generated such that a zero cross detection signal φZC generated by microcomputer 18, as based on an input voltage Vac as shown in FIG. 2, serves as a trigger. Voltage Vac is sinusoidal ac voltage having undergone full wave rectification. Microcomputer 18 samples input voltage Vac, and when input voltage Vac is equal to or smaller than a preset threshold voltage Vth, microcomputer 18 pulls zero cross detection signal φZC high (at times t0, t2, t4), and when input voltage Vac is equal to or larger than threshold voltage Vth, microcomputer 18 pulls zero cross detection signal φZC low (at times t1, t3, t5), and zero cross detection signal φZC is generated by using software.

Note that a circuit having a resistance element, a diode and a photo coupler combined together, a comparator or similar hardware may be employed to generate and input zero cross detection signal φZC to microcomputer 18 to serve as a trigger for outputting control signal φZC.

Furthermore, microcomputer 18 adjusts target voltage Vt in accordance with input current Iin. When a larger current is consumed, the power supply terminal has a voltage with a larger noise level. Accordingly, input current Iin detected for matching phases is also used as a variable used to adjust target voltage Vt. As input current Lin increases, target voltage Vt is reduced to allow the power supply terminal to have a voltage with a reduced noise level.

Figure 3:
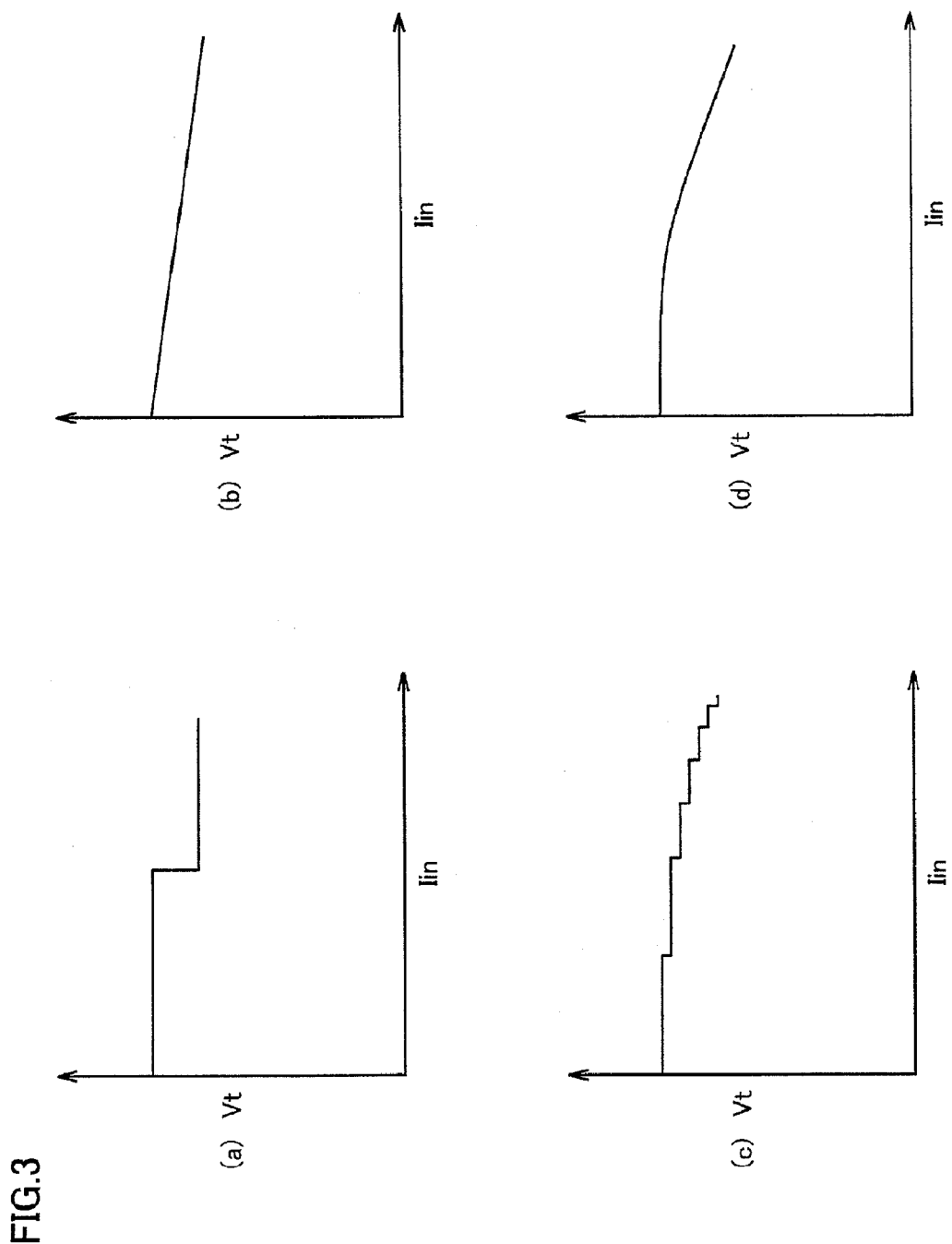
FIG. 3 exemplarily represents a method of setting a target voltage in the microcomputer shown in FIG. 1.

FIGS. 3(a) to 3(d) exemplarily represent a relationship between input current Iin and target voltage Vt. For example, as shown in FIG. 3(a), when input current Iin exceeds a threshold current, target voltage Vt is responsively reduced. In this example, it is recommended to provide a comparator with a hysteresis characteristic or prohibit switching target voltage Vt only for a predetermined masking period, so that when input current Iin substantially attains the threshold current, target voltage Vt does not hunch.

Furthermore, as shown in FIG. 3(b), as input current Iin increases in level, target voltage Vt may be reduced in proportion thereto. Alternatively, as shown in FIG. 3(c), as input current Iin increases in level, target voltage Vt may be reduced stepwise. Alternatively, as shown in FIG. 3(d), as input current Iin increases in level, target voltage Vt may be reduced at a larger rate in the form of a curve of a quadric. Alternatively, such a linear relationship as shown in FIG. 3(b) may be provided with such an upper or lower limit compensation relationship as shown in FIG. 3(a) to adopt a method for control that combines FIGS. 3(a) and (b) together.

When a compressor for example of an air conditioner, a refrigerator or the like is driven, and the compressor rotates at a higher rate, then, input current Iin increases and reactor 11 has a large voltage drop, and output voltage Vo decreases in level. Thus, the larger input current Iin is, the more target voltage Vt can be decreased. It should be noted, however, that output voltage Vo should not be an output voltage below a limit value allowing inverter 16 to be controlled. The output voltage corresponding to the limit value allowing inverter 16 to be controlled is a minimum dc voltage that can increase the compressor's rate of rotation to a desired value.

When pulse width modulation (PWM) control or the like is employed to drive the compressor, and once an output's PWM duty has attained 100%, the compressor's rate of rotation cannot be increased any more. To further increase the compressor's rate of rotation, it is necessary to increase the output's dc voltage. The limit output voltage varies depending on the compressor's rate of rotation, a load torque of the motor provided in the compressor, and the like, and for example, apart from a target output voltage applied in normal control, any minimum output voltage value in proportion to the rate of rotation may be set in the microcomputer to prevent an output voltage from being equal to or smaller than that value.

Target voltage Vt may be set in a method as follows: When active filter 10 does not provide increased voltage, output voltage Vo is obtained in an experiment, and similarly, an increased voltage value X(V) required to match a current's phase to a voltage's phase is obtained in an experiment. Output voltage Vo plus approximately X(V) serves as target voltage Vt, and target voltage Vt is previously stored in microcomputer 18 for control. Alternatively, a balance of input current Iin and input voltage Vin is detected for providing automatic control. When the balance is "1", a power factor of approximately "1" is provided.

Figure 4:
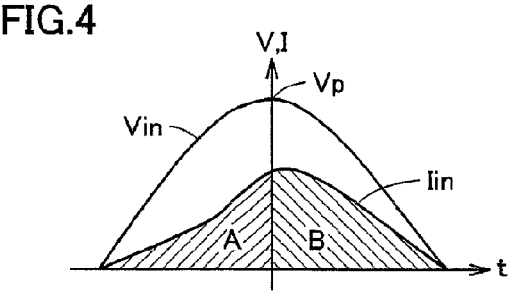
FIG. 4 represents a method of detecting a balance value of an input current in the microcomputer shown in FIG. 1.

Furthermore, target voltage Vt is set while a power factor is detected, as follows: This method notes that when target voltage Vt is excessively low, control signal φC has an excessively small duty ratio, and as shown in FIG. 4, input current Iin is disturbed in waveform in comparison with input voltage Vin. Target voltage Vt is decreased to such an extent that input current Iin has a waveform with its right and left portions out of balance, and the thus decreased target voltage Vt with a voltage value Y(V) added thereto to provide some extent of margin is set as a target voltage.

The balance of input current Iin in waveform is detected as follows: Input current Iin and input voltage Vin are sampled, Input voltage Vin has a peak value Vp, which serves as a center to divide input current Iin in two in waveform. An integral of the former half of input current Iin is indicated as A and that of the latter half thereof is indicated as B, and target voltage Vt is decreased for example until A/B or B/A attains a value equal to or smaller than a set threshold balance (e.g., 0.99), and input voltage Vin obtained at that time plus Y(V) is set as an initial value Vini of target voltage Vt.

In the first embodiment microcomputer 18 internally compares levels in voltage, generates a signal driving IGBT 13, and the like. More specifically, microcomputer 18 performs a basic operation including detecting input voltage Vin, input current Iin and output voltage Vo and matching input voltage Vin and input current Iin in phase with each other. This can contribute to a reduced hardware configuration and also provide an improved power factor and a reduced harmonic current.

Furthermore, a value of input current Iin that has conventionally been detected to be used only to be in phase with input voltage Vin is utilized to correct target voltage Vt. This can eliminate the necessity of introducing additional information input to allow the power supply terminal to have a voltage with a reduced noise level.

Second Embodiment

Figure 5:
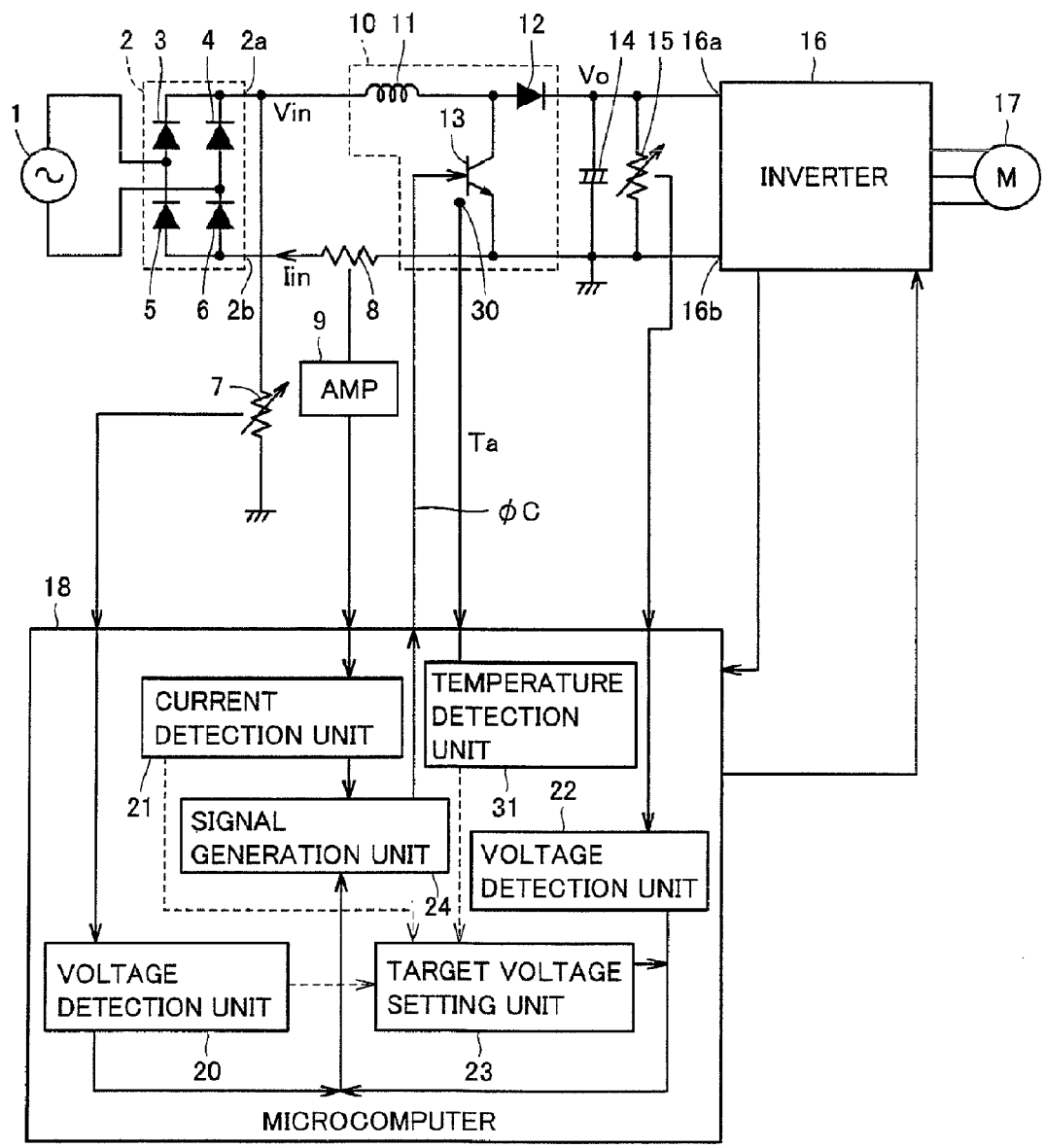
FIG. 5 is a block diagram showing a configuration of a power supply device in a second embodiment of the present invention.

FIG. 5 is a block diagram showing a configuration of a power supply device in a second embodiment of the present invention, as compared with FIG. 1. The FIG. 5 power supply device differs from the FIG. 1 power supply device in that a temperature sensor 30 is provided in a vicinity of IGBT 13 and microcomputer 18 is provided with a temperature detection unit 31.

Temperature sensor 30 detects temperature Ta of IGBT 13 and outputs a signal having a level in accordance with the detected temperature. Temperature detection unit 31 receives the signal from temperature sensor 30 and generates therefrom a digital signal indicating temperature Ta of IGBT 13, and provides the signal to target voltage setting unit 23. Target voltage setting unit 23 decreases target voltage Vt as input current Iin increases, and target voltage setting unit 23 decreases target voltage Vt as temperature Ta of IGBT 13 increases.

Note that temperature sensor 30 may be provided in a vicinity of IGBT 13 to directly detect temperature Ta of IGBT 13. A heat sink employed to dissipate heat of IGBT 13 may be provided with temperature sensor 30 to indirectly detect temperature Ta of IGBT 13.

The temperature of IGBT 13 increases for larger values of input current Iin and larger currents passing through IGBT 13. Reducing such rise in the temperature of IGBT 13, in combination with controlling target voltage Vt, as based on input current Iin, allows the power supply terminal to have a voltage with a reduced noise level, while reducing the risk that IGBT 13 may be destroyed due to high temperature, and thus providing increased safety. Furthermore, an inexpensive IGBT 13 can be adopted, which contributes to a reduced cost.

Figure 6:
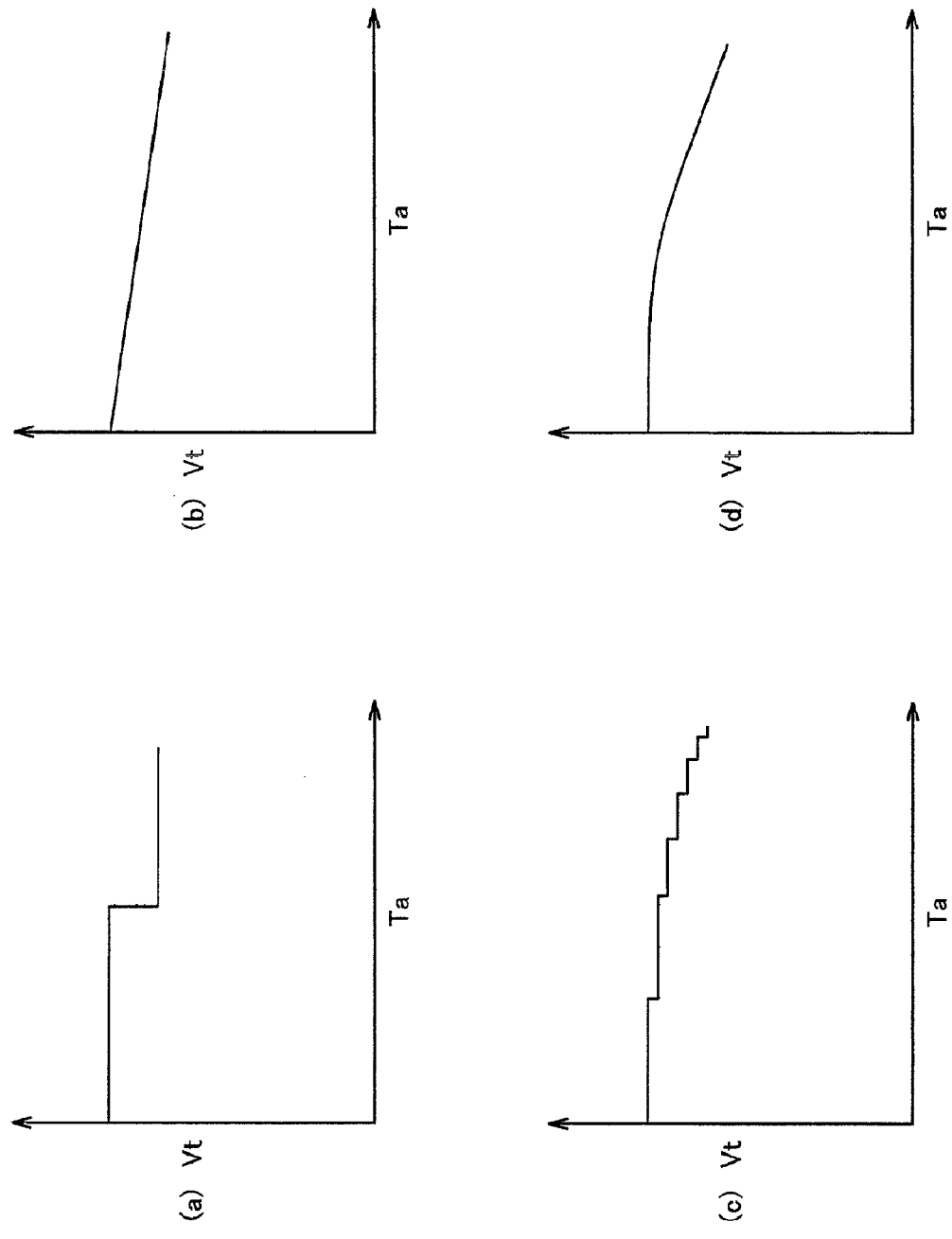
FIG. 6 exemplarily represents a method of setting a target voltage in a microcomputer shown in FIG. 5.

FIGS. 6(*a*) to 6(*d*) exemplarily represent a relationship between temperature Ta of IGBT 13 and target voltage Vt. For example, as shown in FIG. 6(*a*), when temperature Ta exceeds a threshold temperature, target voltage Vt is decreased by Z(V). Alternatively, as shown in FIG. 6(*b*), as temperature Ta increases in level, target voltage Vt may be decreased in proportion thereto, or as shown in FIG. 6(*c*), as input current En increases in level, target voltage Vt may be decreased in stepwise. For FIG. 6(*c*), it is recommended to increase an amount of target voltage Vt that is decreased for high temperature. Furthermore, as shown in FIG. 6(*d*), as temperature Ta increases, target voltage Vt may be decreased at a larger rate in the form of a curve of a quadric. Furthermore, such a linear relationship as shown in FIG. 6(*b*) may be provided with an upper or lower limit compensation relationship to adopt a method of control that combines FIGS. 6(*a*) and 6(*b*) together.

Note that when target voltage Vt is adjusted based on temperature Ta of IGBT 13, it is more important to ensure the safety of IGBT 13 than to maintain a power factor. Accordingly, the target value is not controlled based on a balance value of input current Iin, as has been described in the first embodiment.

Figure 7:
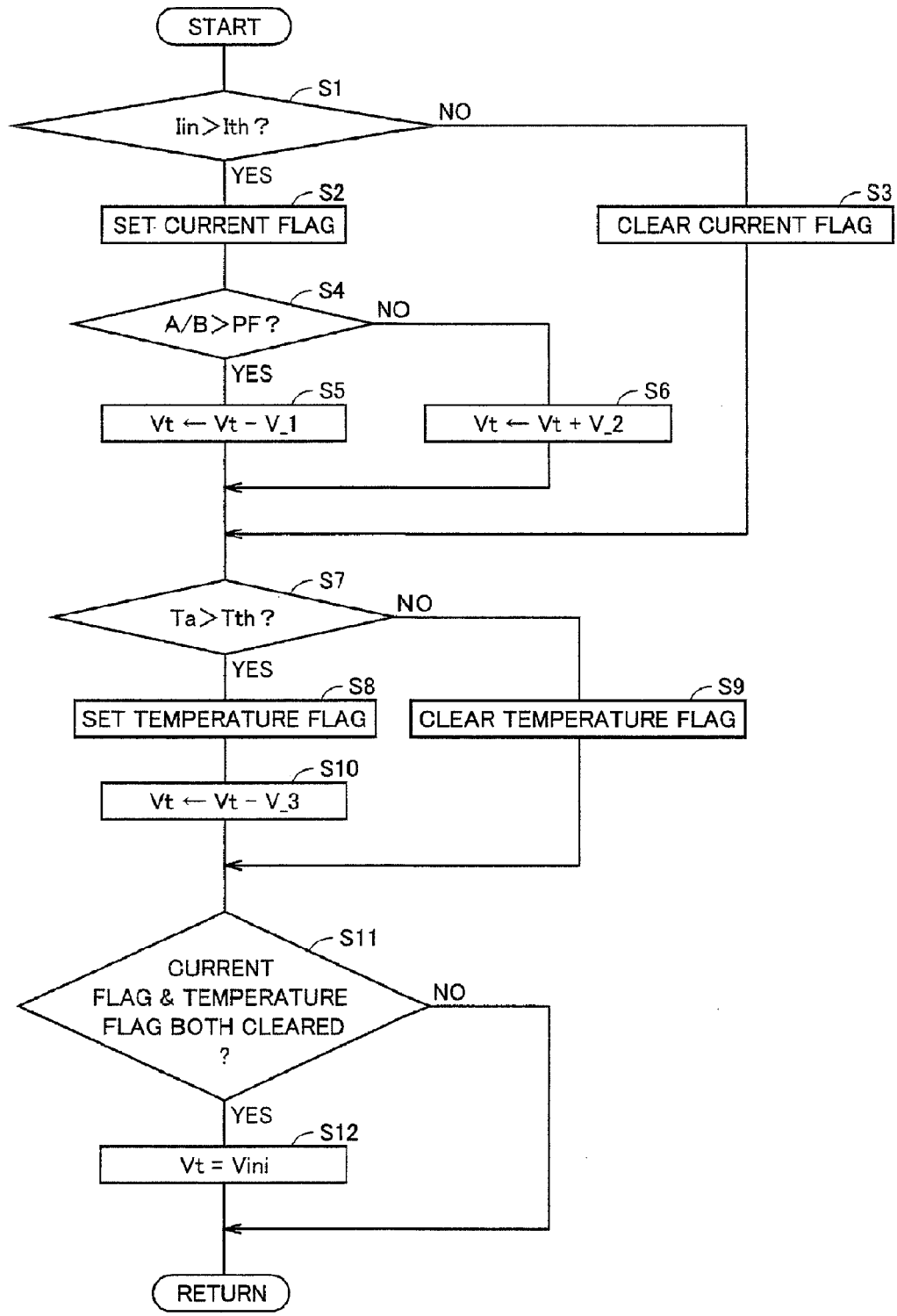
FIG. 7 is a flow chart representing an operation of the microcomputer shown in FIG. 5.

FIG. 7 is a flow chart representing an operation of microcomputer 18. The FIG. 7 method is performed as follows: If input current Iin exceeds a threshold current Ith, target voltage Vt is decreased. If input current Iin has a balance value A/B smaller than a set value PF, target voltage Vt plus Y(V) is provided. If temperature Ta of IGBT 13 exceeds a threshold temperature Tth, target voltage Vt is decreased.

More specifically, while the power supply device is driven, microcomputer 18 constantly monitors input current Iin, and determines in step S1 whether input current Iin has exceeded threshold current Ith. If Iin is larger than Ith, then the control proceeds to step S2 to set a current flag, and proceeds to step S4. If Iin is not larger than Ith then the control proceeds to step S3 to clear the current flag, and proceeds to step S7.

In step S4 the control determines whether input current Iin has balance value A/B exceeding set value PF. Integrals A and B of input current Iin are stored in microcomputer 18. As integrals A and B, only the latest value thereof may be used or an average value of a plurality of integrals A and B may be used.

If A/B is larger than PF, the control proceeds to step S5 to provide the currently provided target voltage Vt minus a predetermined voltage V_1, i.e., a voltage Vt–V_1 as a new target voltage Vt, and proceeds to step S7. If A/B is not larger than PF, then the control proceeds to step S6 to provide the currently provided target voltage Vt plus a predetermined voltage V_2, i.e., a voltage Vt+V_2 as a new target voltage Vt, and proceeds to step S7. V_1 and V_2 may be equal in value.

Whenever step S5 or S6 is performed, the step is followed by step S7. In step S7, the control determines whether temperature Ta of IGBT 13 has exceeded threshold temperature Tth. If Ta is larger than Tth, the control proceeds to step S8 to set a temperature flag, and proceeds to step S10. If Ta is not larger than Tth, the control proceeds to step S9 to clear the temperature flag, and proceeds to step S11. In step S10 the control provides the currently provided target voltage Vt minus a predetermined voltage V_3, i.e., a voltage Vt–V_3 as a new target voltage Vt, and proceeds to step S11.

In step S11 the control determines whether the current flag and the temperature flag have both been cleared, and if so, the control proceeds to step S12 to reset target voltage Vt to initial value Vini. If at least one of the two flags is set, the control returns to step S1.

In the second embodiment, primary objects of employing active filter 10, i.e., an improved power factor and a reduced harmonic current, can be achieved, and in addition thereto, simultaneously, the power supply terminal can have a voltage with a reduced noise level and IGBT 13 can be prevented from having an increased temperature.

Furthermore, comparing levels in voltage, generating a signal driving IGBT 13, or a function that has been conventionally implemented by external circuitry can be implemented by microcomputer 18, and in addition, conventionally often utilized temperature Ta of IGBT 13 and input current Iin can be used to adjust target voltage Vt, and it is not necessary to additionally introduce a new circuit or the like. In fact, a reduced number of components and a substrate having a reduced area can be achieved and thus contribute to a reduced cost.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

DESCRIPTION OF THE REFERENCE SIGNS

1: ac power supply, 2: rectifier circuit, 2*a*: positive voltage output node, 2*b*: negative voltage output node, 3-6: diode, 7, 15: resistor for voltage division, 8: resistor for current detection, 9: amplifier, 10: active filter, 11: reactor, 12: diode, 13: temperature sensor, 14: smoothing capacitor, 16: inverter, 16*a*: positive voltage input node, 16*b*: negative voltage input node, 17: ac motor, 18: microcomputer, 20, 22: voltage detection unit, 21: current detection unit, 23: target voltage setting unit, 24: signal generation unit, 30: temperature sensor, 31: temperature detection unit.

The invention claimed is:

1. A power supply device comprising:
   a rectifier circuit rectifying a first alternate current voltage;
   an active filter provided at a stage subsequent to said rectifier circuit;
   a smoothing circuit smoothing a voltage output from said active filter to generate a direct current voltage;
   an inverter converting said direct current voltage to a second alternate current voltage, said active filter including
      a reactor having one terminal receiving a voltage output from said rectifier circuit,
      a diode having an anode connected to said reactor at the other terminal, and a cathode connected to said smoothing circuit, and
      a switching element connected between the other terminal of said reactor and a line of a reference voltage; and
   a microcomputer operative to detect a current input to said active filter, a voltage input to said active filter, and said voltage output from said active filter and generate a target voltage based on said current input to said active filter, and control said switching element to turn on/off said switching element to match said current input to said active filter and said voltage input to said active filter in phase with each other and also match said voltage output from said active filter to said target voltage.

2. The power supply device according to claim 1, wherein said microcomputer decreases said target voltage as said current input to said active filter increases.

3. The power supply device according to claim 2, wherein a period in which said switching element is turned on and off is settable at any value.

4. The power supply device according to claim 1, further comprising a temperature sensor detecting temperature of said switching element, wherein said microcomputer generates said target voltage based on said temperature detected by said temperature sensor and said current input to said active filter.

5. The power supply device according to claim 4, wherein said microcomputer decreases said target voltage as said current input to said active filter increases, and said microcomputer decreases said target voltage as said temperature detected by said temperature sensor increases.

6. The power supply device according to claim 5, wherein a period in which said switching element is turned on and off is settable at any value.

7. The power supply device according to claim 4, wherein a period in which said switching element is turned on and off is settable at any value.

8. The power supply device according to claim 1, wherein a period in which said switching element is turned on and off is settable at any value.

* * * * *